United States Patent
Bowling

[11] Patent Number: 5,881,753
[45] Date of Patent: Mar. 16, 1999

[54] PASSIVE FLUID LEVEL CONTROLLER

[76] Inventor: Alan P. Bowling, 131 Anchor Bay Ter., Sunnyvale, Calif. 94086

[21] Appl. No.: 647,578

[22] Filed: May 13, 1996

[51] Int. Cl.[6] .............................. A01K 63/00; F16K 21/20
[52] U.S. Cl. .............................. 137/1; 137/132; 137/143; 137/151; 137/216; 137/386; 137/454; 137/393; 119/72; 210/169; 210/416.2
[58] Field of Search .................................... 137/130, 132, 137/142, 143, 386, 453, 454, 151, 216, 393; 119/72; 210/109, 169, 416.2

[56] References Cited

U.S. PATENT DOCUMENTS

| | | | |
|---|---|---|---|
| 359,502 | 3/1887 | Denison | 137/142 |
| 1,235,316 | 7/1917 | Henderson | 137/130 |
| 1,240,532 | 9/1917 | Barrow et al. | 137/130 |
| 1,564,430 | 12/1925 | Maddrell | 137/130 |
| 1,972,962 | 9/1934 | Weber | 137/454 |
| 2,055,334 | 9/1936 | Bukoski et al. | 222/47 |
| 2,059,716 | 11/1936 | Swinburne | 137/130 |
| 2,481,984 | 9/1949 | Deniau | 137/143 |
| 2,556,396 | 6/1951 | Pontones | 137/132 |
| 3,547,704 | 12/1970 | Pompon | 137/132 |
| 4,861,465 | 8/1989 | Augustyniak | 137/143 |

FOREIGN PATENT DOCUMENTS

| | | | |
|---|---|---|---|
| 258759 | 9/1926 | United Kingdom | 137/453 |

Primary Examiner—George L. Walton
Attorney, Agent, or Firm—Carol D. Titus; James J. Leary

[57] ABSTRACT

A fluid level controller which replaces fluid lost from a container thus maintaining the fluid level in the container. It is comprised of the following major pieces: an airtight reservoir (10) with cap (14), fill stem (12), feed lube (16), and tube attachment fittings (18*a* and 18*b*); several lengths of fluid conduit, (22*a,b*) and a u-bend (26) which form a siphon such that one end reaches into the bottom of reservoir (10) and the other reaches into the container below the desired fluid level; a length of conduit, (22*c*) which forms an air return line allowing air into reservoir (10); a stand (8) atop which sits the reservoir; a tubing clip (24); and a shut-off valve (20). The u-bend (26) allows the controller to preserve the initial prime of the system so that it only needs to be primed once. The shut-off valve (20) allows easy refilling of the controller once the fluid reservoir empties. These two features make the controller extremely easy to use. When set up correctly this system uses air pressure to replace fluid lost from a container. Fluid is replaced at any rate up to a specified upper limit, in effect controlling the fluid level in the container. In operation the controller has no moving parts and uses no electricity, thus the mechanism has an extremely low risk of failure. This device has been shown to be an effective, safe, reliable, and efficient means for relieving some of the maintenance associated with owning an aquarium.

19 Claims, 2 Drawing Sheets

PASSIVE FLUID LEVEL CONTROLLER

FIELD OF INVENTION

This invention relates to control of fluid levels as applied to the problem of maintaining a level of fluid in a container. It is particularly useful when used in conjunction with an aquarium. Here the controller is used to replace fluid lost due to evaporation.

BACKGROUND

Motivation

Anyone involved with aquaria will testify that these systems require a certain amount of maintenance. One type of maintenance involves replacing water lost due to evaporation. All aquariums require this type of maintenance but some aquaria take it to an extreme, losing nearly a gallon per day of water to evaporation. Too much water loss may result in damage to some aquarium system components, such as the water pump if one is in use. This situation may also be detrimental for the inhabitants of some aquariums. The concentration of other chemicals and minerals in solution with water, salt for instance, may reach unhealthy levels as water is lost. The owner of aquaria with high rates of water loss cannot even go on weekend vacations without the worry of finding someone to watch the aquarium. The mechanism presented in this patent is designed mainly for these types of systems but is also a solution for any problem involving control of fluid levels in a container.

DISCUSSION OF PRIOR ART

There are many devices available in the home aquarium industry which automatically add fluid to an aquarium. Many of these devices use pumps which deliver fluid at some manually settable rate. These devices consist mainly of a fluid reservoir and a water pump which has a manually adjustable delivery rate. Other devices may use a fluid level sensor which activates a pump when the fluid level drops below a certain point. These devices have some type of fluid supply, a fluid level sensor, and possibly a pump. When the fluid level drops below some point it triggers the sensor, activating a pump which delivers more fluid into the system. Once the fluid level reaches a desired height the sensor shuts off the pump.

The main drawback in these designs is that they use pumps and electricity. Recent studies suggest that stray electrical charges introduced into an aquarium by electronic equipment, over time may be detrimental to the health of the inhabitants. The cost of operating electronic equipment is also a drawback. There is also the risk of failure of these mechanisms due to power outages or natural wear and tear on the pump. Finally, some of the mechanisms based on settable supply rates do not automatically adjust their supply rate to compensate for daily or seasonal variations in the rate of water loss.

Other types of apparatus rely on float valves to trigger the addition of fluid to the system. These devices consist of some type of fluid supply along with a float valve. These valves are similar to those used in some household toilets. The level of the fluid raises or lowers the float which closes or opens a fluid passage bringing fluid from the fluid supply. However float valves have a fairly high risk of mechanical failure (toilets for example). This risk is not acceptable since failure of the device may cause severe damage to other system components.

The device shown in Pat. No. 1,235,316 will also regulate a fluid level. It consists of a fluid reservoir, fluid supply and air return passages, and a priming device. The device uses air pressure to control the delivery of fluid when the fluid level gets too low. The disadvantage to this device is that it must be manually be primed every time the fluid reservoir empties.

INVENTION

Objects and Advantages

The objects and advantages of the present invention are as follows:

(1) Mechanism will supply fluid at a variable rate up to an upper limit which depends on the specific dimensions of the mechanism. In other words, the device replaces the amount of fluid lost regardless of the rate of loss, up to a predetermined upper limit;

(2) While regulating the fluid level the present mechanism has no moving parts and thus a very low risk of mechanical failure;

(3) Mechanism works with any size or shape container;

(4) No permanent modifications to the existing container are required to use device;

(5) Mechanism uses no electricity;

(6) Mechanism only needs to be primed once after setup;

(7) Mechanism can operate from some distance away from the container;

(8) Mineral and chemical supplements can be added to supply fluid in a known concentration and delivered to the container thus performing a function referred to as "dosing" in the aquarium industry;

(9) Fluid level to maintain is easily settable and adjustable;

(10) Mechanism is easy to set up and use;

(11) The flexibility of the siphon design allows the unit to be set up almost anywhere including the tight spaces underneath an aquarium stand.

Further objects and advantages of my invention will become apparent from a consideration of the drawings and ensuing description.

SUMMARY

The aforementioned is a passive fluid level control device applied to the problem of replacing fluid lost from a container. In performing this function the mechanism controls the level of fluid in the container. Its main components consist of a fluid reservoir, a fluid supply line, and an air return line. The reservoir is comprised of a tank with fill stem and air tight cap, and fluid supply and air return passages. The fluid supply line is comprised of several lengths of conduit which form a siphon when connected with the fluid supply passage of the fluid reservoir. One leg of the siphon reaches the bottom of the reservoir and the other reaches below the desired fluid level. The air return line is comprised of a length of conduit. The mechanism also has a shut-off valve and a u-bend in the fluid supply line which acts as a fluid trap. These two elements are used to keep the mechanism primed after the initial priming.

DRAWING DESCRIPTIONS

PREFERRED EMBODIMENT

Physical Description

Figure 1:
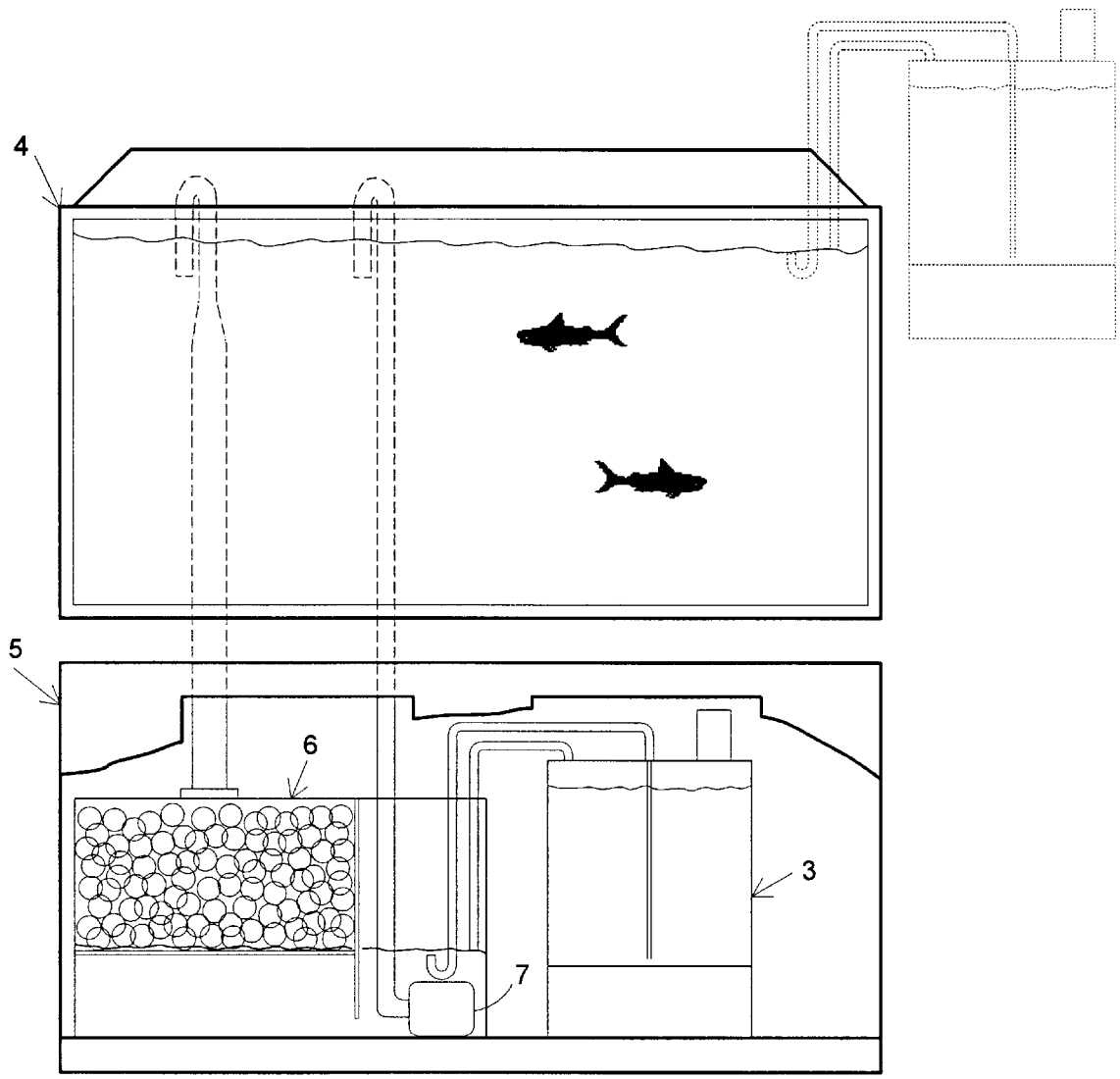
FIG. 1 shows a schematic of a typical Passive Fluid Level Controller setup in relation to an aquarium.

A typical setup of the fluid level controller is shown in FIG. 1. Here the aquarium 4 sits atop the aquarium stand 5. Fluid is siphoned from the aquarium 4 into the filter box 6 sitting beneath the aquarium stand 5. The fluid is filtered, treated, and pumped back into the aquarium 4 by a pump 7. In this setup the fluid level in the tank 4 remains constant while the fluid level in the filter 6 changes as fluid evaporates from the aquarium 4. Here the Passive Fluid Level Controller 3 sits beside the filter 6 and maintains the fluid level in filter 6. FIG. 1 also shows how the Passive Fluid Level Controller 3 can be used directly with an aquarium 4 if there is no filter 6 in the system. For this configuration, the Passive Fluid Level Controller 3 is shown in dashed lines. Here, as the fluid level in the aquarium 4 drops as fluid is lost due to evaporation, the Passive Fluid Level Controller 3 adds water directly to the aquarium 4 to compensate for the lost water.

Figure 2:
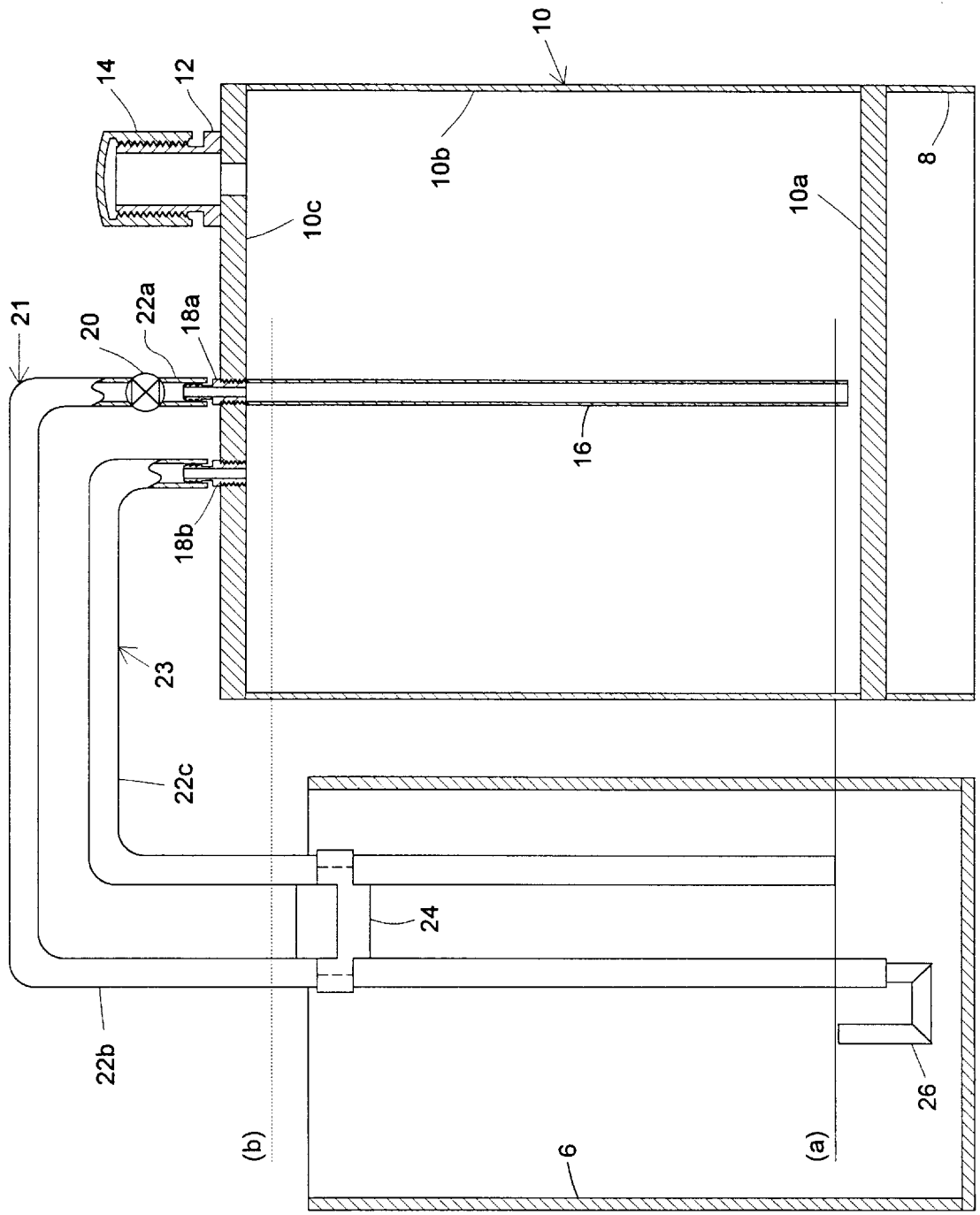
FIG. 2 shows a close-up cross sectional view of all parts comprising the Passive Fluid Level Controller poised for operation near the filter or similar container.

FIG. 2 shows a detailed cross-sectional view of the Passive Fluid Level Controller 3. The components of the controller 3 are a reservoir 10, a fluid supply line 21, an air return line 23, a stand 8, and a tubing clamp 24. The reservoir 10 is comprised of a reservoir base 10a, reservoir wall 10b, reservoir top 10c, fill stem 12, fill cap 14, reservoir feed tube 16, and fittings 18a and 18b. The fluid supply line 21 is comprised of connection tube 22a, shut-off valve 20, supply tube 22b, and u-bend 26. The air return line 23 consists of air inlet tube 22c.

In FIG. 2 reservoir 10 sits atop stand 8. Stand 8 can be made of any material in any shape or size as long as it can support the reservoir and its fluid contents in the position and orientation shown in FIG. 2. The dimensions of stand 8 are specific to the needs of each individual user. In the preferred embodiment stand 8 is a cylindrical tube of acrylic approximately 4 inches tall with a ⅛ inch thick wall. This height works well with most aquarium filter boxes. Here stand 8 is cemented to the reservoir base 10a.

In this embodiment the cementing together of any parts, with the exception of the stand 8 to the reservoir 10, with an adhesive is done in such a way as to insure the joint will be airtight. Currently a non-toxic, high strength, acrylic cement is preferred. However, any non-toxic, high-strength, adhesive which can form airtight joints may be used. Weld-On™ is an example of a cement which fits the necessary criteria and can usually be found where acrylic supplies are sold.

Fluid reservoir 10 can be made in any shape or size and of almost any material, clear or opaque, which can hold fluid without contaminating it. The reservoir should be structurally strong enough to contain and support the desired fluid capacity. It should also possess the aforementioned parts, fill stem 12, cap 14, feed tube 16 etc., or possess material properties which allow it to be fitted with equivalent components. In the preferred embodiment the fluid containment portion of reservoir 10 is comprised of base 10a, wall 10b, and top 10c. The fluid capacity of the reservoir is variable and determines the dimensions of base 10a, top 10c, and wall 10b. Here the base 10a and top 10c are 12 inch diameter circles cut out of ½ inch thick acrylic sheet. Wall 10b is a 12 inch length of acrylic tubing with a 12 inch outside diameter and ⅛ inch thick wall. These dimensions yield a fluid capacity of approximately 5.6 gallons. Base 10a is cemented to the bottom of wall 10b. Top 10c has three holes passing completely through it. The larger hole is approximately one inch in diameter. The two smaller holes are approximately ¼ inches in diameter and threaded with ¼ inch National Standard Pipe Threads. Top 10c is cemented to the top of wall 10b after reservoir feed tube 16 has been cemented over one of the threaded holes in top 10c, as shown in FIG. 1. Tube 16 is acrylic tubing approximately 11 ¾ inches long with a ½ inch outside diameter and ⅛ inch thick wall.

Fill stem 12 is a modified poly-vinyl chloride (PVC) 2 inch diameter threaded male slip fitting which is available in most hardware stores. Fill stem 12 is made by cutting the unthreaded end from fitting and sanding the cut end flat. Stem 12 is cemented over the 1 inch diameter hole in top 10c using Weld-OnTM. Fill cap 14 is a threaded PVC cap also available in most hardware stores. A convenient way to assure an airtight seal between cap 14 and stem 12 is to wrap Teflon tape, available at most hardware stores, around the threads of stem 12; however, other methods may be used if desired. 6

The fittings 18a and 18b allow connection of supply tube 22b and air inlet tube 22c to the reservoir 10. Many other fittings and connection means can be used as long as the resulting siphon and air return line 23 are airtight. All of the connections to the reservoir 10 are done in an airtight manner to form a hermetic seal around the reservoir. This allows flow in only the fluid supply line 21, the air return line 23, and the fill stem 12, which may be intermittently sealed. Fittings 18a and 18b are hose barb fittings both of which have a threaded end to which Teflon tape may be applied. The fittings are screwed into the two threaded holes in top 10c. These fittings are available in most hardware stores.

Connection tube 22a, supply tube 22b, and air inlet tube 22c can be made of any material which does not contaminate the fluid they carry and can be connected to the reservoir in a manner such that the connection is airtight. The tubing must also have a large enough inner diameter to prevent friction or capillary action from plugging the fluid passage. In this embodiment tubes 22a, 22b, and 22c are made of flexible clear vinyl tubing with a ⅜ inch inner diameter and 3/16 inch thick wall. Connection tube 22a is pressed over the barbed ends of fitting 18a and shut-off valve 20 and is held there by friction. Supply tube 22b is pressed over the other barbed end of shut-off valve 20 and is held there by friction. Air inlet tube 22c is pressed over the barbed end of fitting 18b and is held by friction.

Shut-off valve 20 can be any of several commercially available manual shut-off valves as long as it will in no way contaminate the fluid passing through it. It should facilitate the connection of tubing to it such that the connection is airtight. It should also have a fluid passageway which is fairly large in diameter. Here valve 20 has hose barb fittings at both ends and a ⅜ inch inner diameter fluid passage through it.

U-bend 26 can be made of any non-contaminating material and should have a fairly large inner diameter. Here u-bend 26 is made of three pieces of ⅜ inch outside diameter acrylic tubing with a ⅛ inch wall. The tubing is cut at 45 degree angles and cemented together. Tubing clip 24 can be made of any material and can be of any shape or form as long as it can securely hold the supply tube 22b and air return tube 22c in a fixed position relative to the container. In this embodiment a non-contaminating material is preferred. The clip 24 comprises a tubing clamp mounted to an acrylic bracket. Although others may be used, the currently preferred clamp is obtained from RyanHerco, a maker of fluid flow control apparatus with many locations across the United States. Supply tube 22b and air inlet tube 22c are pressed into clip 24 and held by friction. The acrylic bracket is a u-shaped bracket available in most acrylic stores which fits over the side of the container.

Operation

None of the connections involving tubes 22a, 22b, and 22c are made when the mechanism is delivered to the user.

The first step in setting up the device is to determine the lengths of tubes 22a, 22b, and 22c for the particular system. In FIG. 2 level (a) shows the desired fluid level to maintain and (b) is the level of fluid in the reservoir 10, which changes as the reservoir empties. It is recommended that the mechanism be set up as shown in FIG. 2 but other setups are possible. In the following discussion a set of minimal requirements for the proper functioning of the fluid level controller will be presented, other combinations of minimal requirements exist, but following is the preferred set. Then the rationale for the specific embodiment shown in FIG. 2 will be given.

The minimum setup requirements are as follows. The reservoir 10 should be positioned such that base 10a will be below level (a) as shown in FIG. 2. Fluid level (a) is determined by the position of the outlet of fluid supply line 21. Thus stand 8 can actually be omitted. Once the tubing has been cut to size supply tube 22a, valve 20, connection tube 22b, and air return tube 22c should be assembled and connected to the reservoir 10. Connecting u-bend 26 to return tube 22c is optional. The purpose of u-bend 26 is to act as a fluid trap to prevent the siphon from emptying of fluid and to prevent air bubbles in the fluid in aquarium 4 or filter 7 from rising into fluid supply line 21 and possibly breaking the siphon. If neither of these functions is needed, u-bend 26 may be omitted. This will become clearer later.

Cap 14 is then removed from stem 12 and the reservoir 10 is filled until the fluid in the reservoir 10, level (b), is higher than level (a). Cap 14 is then screwed onto stem 12 hand tight. Tubing clip 24 is then placed over the side of the container as shown in FIG. 2 and fluid supply tube 22b is pressed into clip 24 such that the outlet of fluid supply line 21 is below fluid level (a). The user can now prime the siphon by blowing into air return tube 22c, forcing all air out of tube 22b until fluid is freely flowing from fluid supply line 21. Once this is accomplished air return tube 22c should be pressed into tubing clip 24. Again, the positioning of the outlet of fluid supply line 21 determines level (a), the fluid level to be maintained.

At this point if the actual fluid level in the container 6 is below (a), fluid will continue to siphon from the reservoir 10 into the container 6 until the actual fluid level rises to level (a). Then fluid will begin to rise in air return tube 22c until it reaches approximately (b). This phenomenon allows the air return tube 22c to function as a gauge indicating the approximate level of fluid in the reservoir as long as tube 22c is made of a material which allows one to see the level of fluid inside the tube. Therefore the fluid reservoir 10 can be made of opaque material and placed at some distance from the aquarium or be hidden from view.

When the fluid rising in air return tube 22c reaches approximately level (b) the system will reach equilibrium and fluid will stop siphoning out of reservoir 10. However the siphon remains filled with fluid and primed, it simply ceases to flow. As fluid evaporates from the aquarium 4 the fluid level in filter box 6 will drop below level (a), fluid will empty out of air return tube 22c, and the siphon will begin to flow again. The siphon will flow until the actual fluid level again reaches level (a) and fluid again begins to rise in tube 22c. When the fluid in tube 22c rises to the new level (b) the siphon again will reach equilibrium. This process regulates the fluid level within a small region about level (a) until the fluid level in the reservoir 10, level (b), reaches approximately level (a).

At this point the placement of base 10a and the outlet of fluid supply line 21 in relation to level (a) becomes important. Consider the siphon formed by tubes 16, 22b, and 22a, fitting 18a and valve 20. The siphon has two legs; the inlet leg is on the tube 16 side and the other side is the outlet leg. The actual length of each leg of the siphon is determined by the physical components making up the siphon. However, the effective length of each leg is measured from the highest point in the siphon to the fluid level in contact with that leg. Because of this fact, when the actual fluid level in filter 6 or aquarium 4 moves below level (a) the controller will work to keep the actual fluid level and the fluid level in reservoir 10 equal. However, this means that all of the fluid capacity of reservoir 10 is not used to maintain the desired fluid level (a). To remedy this situation a stand 8 is used to position the base 10a, near but below level (a).

Eventually the fluid level drops below the physical end of one of the legs. In the next paragraphs the behavior of different setups in this situation are discussed with the aim of explaining the rationale behind the chosen setup of FIG. 2, although the minimum setup requirements will achieve the fluid level maintenance.

The minimum requirements do not specify the relative lengths of the two legs other than the ends of each leg should reach below level (a). However, if the physical length of the outlet leg is longer than the physical length of the inlet leg, the siphon may discharge fluid until the fluid level near the inlet leg drops below the end of the inlet leg and the siphon will break and empty of fluid. If this happens the siphon must be primed again when it is re-filled. This situation can be avoided if the valve 20 is closed before the fluid level in the reservoir, (b), goes below the end of tube 16. Here the valve 20 is used to maintain the siphon until the fluid reservoir can be refilled. However, if the actual fluid level in filter 6 or aquarium 4 drops below the end of the outlet leg it will empty of fluid, effectively breaking the siphon.

The siphon break can be avoided by connecting a trap, the u-bend 26, to the fluid supply line 21. Now the effective length of the outlet leg is from the highest point of the siphon to the outlet of the u-bend 26. Here the outlet leg should be made shorter than the inlet leg to prevent the siphon from breaking at the inlet leg while the u-bend 26 prevents the siphon from breaking at the outlet leg. Thus the siphon remains primed for refilling. A second reason for adding the u-bend 26 to the fluid supply line 21 is to prevent air bubbles in the fluid from entering the tube 22b and possibly breaking the siphon. The outlet of the u-bend 26 should be approximately ¼ inches above the end of tube 16 so that if the reservoir is jostled during refilling, sloshing of the fluid remaining in reservoir 10 will not break the seal between the fluid and the end of tube 16, possibly causing the siphon to empty of fluid.

To begin the process again reservoir 10 must be filled such that level (b) is again higher than level (a). Shut-off valve 20 should be closed so the siphon will not flow while filling reservoir 10. Cap 14 is unscrewed from stem 12 and reservoir 10 is filled until level (b) is higher than level (a). Cap 14 is screwed back onto stem 12 hand tight. Valve 20 is then opened and the system should begin to operate once again without any need to reprime the siphon.

Conclusions, Ramifications, and Scope of Invention

The reader will see that the Passive Fluid Level Controller will replace fluid lost from a container while in effect controlling the fluid level within the container in a manner which is efficient, quiet, and uses no electricity. A friend labeled the device a "Green" invention for its low energy requirements. The mechanism has a very low risk of failure while controlling the fluid level because there are no moving parts. This makes the device extremely reliable. Because of the mechanisms simplicity and flexibility it can be easily used by anyone on virtually any task requiring fluid level maintenance.

While my above description contains many specifics, these should not be construed as limitations on the scope of the invention, but rather as an exemplification of one preferred embodiment thereof. It is clear that many other variations are possible. The dimensions, materials and configuration of many of the individual parts of the controller may be altered and remain within the scope of the present invention. Other embodiments and modifications will, no doubt, occur to those skilled in the art. For example, the situation described for the fluid level controller is used with the filter; however, the controller could be used with the aquarium itself or other devices in which it is desirable to keep the fluid level steady. Also many other materials can be used to form the different parts of the mechanism depending on the application. The siphon supply line and air return line may actually be attached through the fill cap or fill stem. Other types of fittings and filling stems are possible as long as the resulting system is airtight. The reservoir may be of any shape and size thus varying the dimensions, and configuration of many of the individual parts of the present invention and can be made of an opaque material since the fluid level in 22c gives an indication of the level of the fluid within the reservoir. Other types of tubing may be used depending on the application. Other uses for this device include maintaining the water level in the reservoirs of various plant potters available on the market today. It can even be used to keep the bowl of water beneath a Christmas tree filled. Accordingly, the scope of the invention should be determined not by the embodiment illustrated, but by the appended claims and their legal equivalents.

| List of Reference Numerals | | | |
| --- | --- | --- | --- |
| 8 | stand | 18a,b | fittings |
| 10 | reservoir | 20 | shut-off valve |
| 10a | reservoir base | 22a | connection tube |
| 10b | reservoir wall | 22b | supply tube |
| 10c | reservoir top | 22c | air inlet tube |
| 12 | fill stem | 24 | tubing clip |
| 14 | fill cap | 26 | u-bend |
| 16 | reservoir feed tube | 28 | container |

I claim:

1. A fluid level controller for maintaining the level of a fluid at a level (a) within a container, said fluid level controller comprising:
   a fluid reservoir,
   a supply tube having an inlet end and an outlet end, said inlet end being positioned within said fluid reservoir, said outlet end being positioned within the container, said supply tube having a U-shaped bend on said outlet end of said supply tube for maintaining a fluid prime within said supply tube thereby maintaining a siphon from said reservoir to the container,
   an air inlet tube having a first end and a second end, said first end being in fluid communication with said fluid reservoir, said second end being positioned within the container at approximately level (a),
   said reservoir being hermetically sealable except for the communications with said supply tube and said air inlet tube.

2. The fluid level controller of claim 1 wherein said supply tube is in the form of an inverted U between said inlet end and said outlet end for establishing said siphon from said reservoir to the container.

3. The fluid level controller of claim 1 further comprising a shut-off means for shutting off fluid flow through said supply tube to maintain a fluid prime within said supply tube for maintaining said siphon from said reservoir to the container.

4. The fluid level controller of claim 2 further comprising a shut-off means for shutting off fluid flow through said supply tube to maintain said fluid prime within said supply tube for maintaining said siphon from said reservoir to the container.

5. The fluid level controller of claim 1 further comprising means for adjusting the height of said second end of said air inlet tube within the container to adjust the height of level (a) within the container.

6. The fluid level controller of claim 1 wherein said inlet end of said supply tube is located at an elevation below said outlet end of said supply tube and said outlet end of said supply tube is located below level (a).

7. The fluid level controller of claim 1 further comprising a sealable filling means for filling said reservoir with fluid, said sealable filling means being spaced apart from said supply tube and said air inlet tube.

8. A fluid level controller for maintaining the level of a fluid at a level (a) within a container, said fluid level controller comprising:
   a fluid reservoir,
   a supply tube having an inlet end and an outlet end, said inlet end being positioned within said fluid reservoir, said outlet end being positioned within the container,
   an air inlet tube having a first end and a second end, said first end being in fluid communication with said fluid reservoir, said second end being positioned within the container at approximately level (a),
   and a sealable filling means for filling said reservoir with fluid, said sealable filling means spaced apart from said supply tube and said air inlet tube,
   said reservoir being hermetically sealable except for the communications with said supply tube and said air inlet tube,
   a sealable filling means for filling said reservoir with fluid.

9. The fluid level controller of claim 8 further comprising a shut-off means for shutting off fluid flow through said supply tube to maintain a fluid prime within said supply tube when said sealable filling means is opened for filling said reservoir with fluid.

10. A method of maintaining a level (a) of fluid in a container, comprising the steps of:
   (i) positioning an inlet end of a siphon tube in a reservoir;
   (ii) positioning a first end of an air inlet tube in the container at said level (a);
   (iii) positioning an outlet end of said siphon tube in the container;
   (iv) positioning a second end of said air inlet tube in fluid communication with said reservoir;
   (v) filling said reservoir with fluid;
   (vi) hermetically sealing said reservoir;
   (vii) filling said siphon tube with fluid;
   (viii) providing a u-shaped bend in said outlet end of said siphon tube.

11. The method of claim 10 further comprising the steps of:
   (ix) temporarily shutting off fluid flow in said siphon tube;
   (x) unsealing said reservoir;
   (xi) refilling said reservoir with fluid;
   (xii) and opening said siphon tube to allow fluid to flow.

12. The method of claim 10 wherein step (i) positions said inlet end of said siphon tube below level (a).

13. The method of claim 10 wherein step (iii) positions said outlet end of said siphon tube at an elevation above said inlet end of said siphon tube.

14. A fluid level controller for maintaining the level of fluid within a container, comprising:

a reservoir, a supply tube in fluid communication with the container and said reservoir, said supply tube having a u-shaped end located within the container, an air inlet tube in fluid communication with the container and said reservoir, a shut-off means for shutting off fluid flow through at least one of said supply tube and said air inlet tube, a filling stem located on said reservoir and spaced apart from said supply tube and said air inlet tube, and a filling stem cap sized to fit said filling stem, wherein said fluid level controller keeps a chosen level of fluid in the container by supplying fluid from said reservoir into the container.

15. The fluid level controller of claim 14 further comprising a container chosen from the group of containers consisting of an aquatic aquarium and a vessel in fluid communication with an aquatic aquarium.

16. The fluid level controller of claim 15 wherein said supply tube and said air inlet tube are connected to said reservoir with fluid tight fittings, said fluid tight fittings sealing said reservoir in a fluid tight manner.

17. The fluid level controller of claim 15 wherein said supply tube has an inlet end, said end being placed proximate the bottom of said reservoir.

18. The fluid level controller of claim 15 wherein said air inlet tube has an end, said end being placed within said container at approximately said chosen level.

19. The fluid level controller of claim 16 wherein said fluid level controller is sized to fit beneath said container.

* * * * *